United States Patent [19]

Hart

[11] 4,188,071
[45] Feb. 12, 1980

[54] RAILWAY VEHICLE BRAKE APPARATUS ARRANGED TO ACCOMMODATE REDUCED EMERGENCY RESERVOIR VOLUME

[75] Inventor: James E. Hart, Trafford, Pa.

[73] Assignee: Westinghouse Air Brake Company, Wilmerding, Pa.

[21] Appl. No.: 916,999

[22] Filed: Jun. 19, 1978

[51] Int. Cl.² ............................................. B60T 15/22
[52] U.S. Cl. ......................................... 303/33; 303/60
[58] Field of Search ..................... 303/1, 7, 33, 59, 60, 303/66, 67, 84 R

[56] References Cited

U.S. PATENT DOCUMENTS

| 2,994,565 | 8/1961 | McClure et al. | 303/33 X |
| 3,992,064 | 11/1976 | Carton et al. | 303/7 |

Primary Examiner—Duane A. Reger
Attorney, Agent, or Firm—R. W. McIntire, Jr.

[57] ABSTRACT

A railway vehicle brake apparatus including a brake control valve device having a service piston valve device operative responsive to a reduction of pressure in the train brake pipe to connect fluid pressure from the auxiliary reservoir to a brake cylinder device to provide a service brake application, and a high pressure spool valve device operative responsive to said reductions of brake pipe pressure exceeding a certain chosen rate to connect fluid pressure from the emergency reservoir to the brake cylinder device in parallel with the auxiliary reservoir pressure connected thereto from said service piston valve device to provide a higher emergency brake application pressure, there being arranged a cut-off valve device between the high pressure spool valve device and brake cylinder device which interrupts the flow of emergency reservoir pressure thereto until the auxiliary reservoir pressure supplied to the brake cylinder device is reduced to a predetermined level and a one-way check valve between the service piston valve device and brake cylinder device to prevent the emergency reservoir pressure from flowing to the auxiliary reservoir.

5 Claims, 1 Drawing Figure

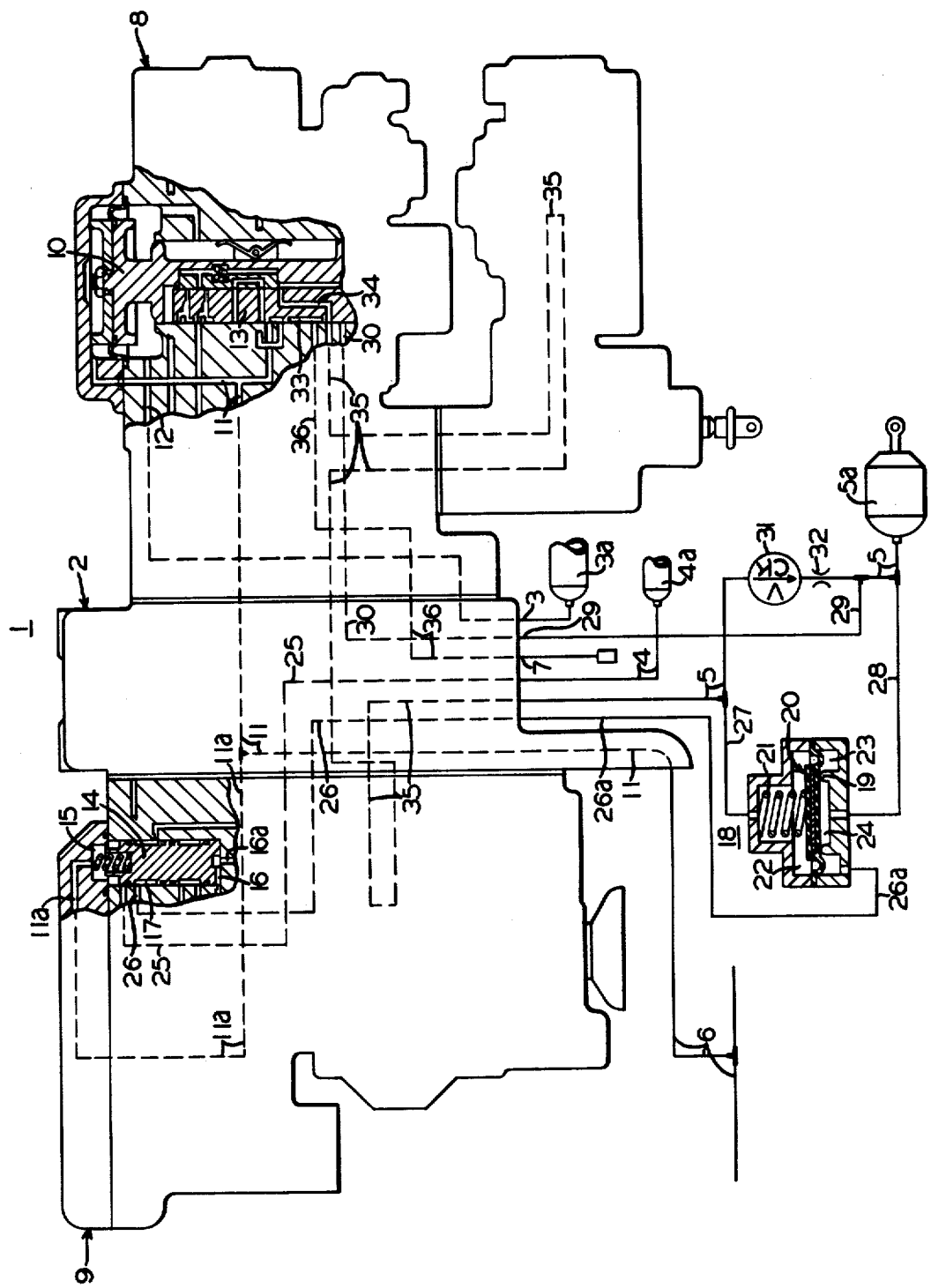

RAILWAY VEHICLE BRAKE APPARATUS ARRANGED TO ACCOMMODATE REDUCED EMERGENCY RESERVOIR VOLUME

BACKGROUND OF THE INVENTION

The present invention is related to freight brake control systems and particularly to a freight brake control system employing the conventional AB/D type brake control valve device, as fully shown and described in Westinghouse Air Brake Company Instruction Pamphlet G-g-5062-16.

Control valves of the above general type have traditionally operated during a brake application to connect the auxiliary reservoir pressure to the brake cylinder devices. In order to obtain higher braking pressure during an emergency brake application, in accordance with A.A.R. requirements, the emergency reservoir pressure is combined with the auxiliary reservoir pressure flowing to the brake cylinders. The A.A.R. specifies that the emergency reservoir pressures be in the order of 15%-20% higher than full service. In order to satisfy this regulation, the emergency reservoir has been designed to provide 3600 cubic inches of volume, which is relatively large by comparison with the 2500 cubic inch auxiliary reservoir, particularly in view of the fact that the additional brake pressure realized during emergency is only slightly higher than during a service application. A large volume emergency reservoir on each car of a train is not only expensive, but requires a considerable amount of space for mounting and takes considerable time to charge, thereby having the effect of extending the time required to release the brakes on cars near the end of a train.

SUMMARY OF THE INVENTION

The objective of the present invention, therefore, is to reduce the size of the emergency reservoir associated with an AB/D control valve device and still obtain emergency brake cylinder pressure corresponding to that obtained with the standard sized emergency reservoir.

In meeting this objective, a cut-off valve device is provided for isolating the emergency reservoir pressure from the brake cylinders and consequently from the auxiliary reservoir until substantially full equalization between the auxiliary reservoir pressure and the brake cylinders occurs. A one-way check valve in the brake cylinder delivery line prevents back-flow of the emergency reservoir pressure to the auxiliary reservoir whenever the cut-off valve device operates, thereby reducing the volume into which the emergency reservoir pressure is equalized and accordingly permitting use of a smaller emergency reservoir to obtain the same emergency brake pressure as heretofore obtained with a standard sized emergency reservoir.

Due to the check valve in the brake cylinder delivery line permitting air flow only in the direction toward the brake cylinders, an exhaust passage is added to the AB/D control valve device to accommodate the release of fluid pressure from the brake cylinders. This requires a slight modification in the service piston slide valve to connect this added exhaust passage to the existing exhaust passage when the service piston moves from service to release position.

The foregoing objective and advantages attendant therewith will become apparent from the following more detailed explanation, when taken with attached single FIGURE drawing schematically showing an AB/D type control valve device arranged in accordance with the present invention.

DESCRIPTION AND OPERATION

Represented in outline form is an AB/D type control valve device 1, which is well known to those skilled in the railway brake art, being modified, as hereinafter explained, to accommodate the present invention. A complete and comprehensive discussion of a conventional AB/D type brake control valve device may be had from the aforementioned instruction pamphlet and will not, therefore, be undertaken here, except to point out the modifications thereto in accordance with the present invention.

Control valve device 1 consists of a pipe bracket 2 having pipe connections via which the control valve device is connected to a pipe 3 and auxiliary reservoir 3a, to a pipe 4 and emergency reservoir 4a, to a pipe 5 and brake cylinder device 5a, to a brake pipe 6, and to a retainer exhaust pipe 7.

Control valve device 1 further consists of a service portion 8 and an emergency portion 9 each mounted to an opposite face of pipe bracket 2. Included in service portion 8 is the conventional service piston 10 subject opposingly to the pressure carried in brake pipe 6 via passage 11 and auxiliary reservoir 3a via passage 12. The service piston 10 includes a service slide valve 13 operable therewith for effecting appropriate port connections in response to movement of the service piston to its different positions. For purposes of subsequently explaining the present invention, service piston 10 has been shown in its brake application position.

Included in emergency portion 9 is the conventional high pressure spool valve 14 subject either to the pressure in brake pipe 6 connected via a branch passage 11a of passage 11 to a chamber 15 on one side of spool 14 or to quick action chamber pressure supplied to a chamber 16 via passage 16a by the emergency piston (not shown) during an emergency brake application. An annular groove 17 is formed about the periphery of spool 14 for effecting the appropriate port connections controlled by the spool in its respective positions.

Shown connected by appropriate piping to control valve device 1 is a diaphragm type cut-off valve device 18 for controlling the delivery of emergency reservoir pressure to brake cylinder device 5a. Cut-off valve device 18 comprises an annular seat valve 19 with which a diaphragm piston valve 20 is engageable under the influence of a bias spring 21 and fluid pressure effective in a chamber 22 formed on the upper side of piston valve 20. In its seated condition, piston valve 20 forms an annular chamber 23 surrounding valve seat 19 and a chamber 24 within the periphery of seat 19, fluid pressure in these chambers 23 and 24 act on piston valve 20 in a direction to effect unseating thereof.

Pipe 4 connecting the emergency reservoir 4a to control valve 1 is connected by a passage 25 to the bore of high pressure spool valve 14, where groove 17 either establishes or cuts off connection of passage 25 with a passage 26, that is in turn connected by a pipe 26a to chamber 23 to cut-off valve device 18. Chamber 22 of cut-off valve device 18 is connected to brake cylinder pipe 5a by a branch pipe 27. A pipe 28 connects chamber 24 of the poppet valve device 18 to brake cylinder 5a in parallel with pipe 5, while another branch pipe 29 of pipe 5 is connected to a passage 30 leading to the bore of service slide valve 13. Disposed in pipe 5 at a point intermediate the connections of branch pipes 27 and 28 therewith is a one-way check valve 31 and a choke 32.

Service slide valve 13 has formed on its face an elongated port 33 and a passage 34 extending between its face and back side. In the brake application position (shown) of service piston 10, passage 34 is aligned with a passage 35, with which pipe 5 is connected. In the release position of service piston 10, passage 34 is blanked and port 33 communicates passage 30 and 35 with a passage 36 that is connected to pipe 7.

From the foregoing description, it will be apparent that a standard AB/D type control valve device can be easily modified in accordance with the present invention simply by the addition of passage 30 and the lengthening of port 33 in the slide valve face sufficient to connect this additional passage 30 to exhaust retainer passage 36 and pipe 7 during brake release. Also, passage 26 leading from high pressure spool valve 14 is connected to pipe 26a of cut-off valve device 18 instead of being connected to passage 35. It is envisioned, further, to incorporate cut-off valve device 18 into either the service portion 8 or emergency portion 9, thereby eliminating such additional piping, as required to show the cut-off valve device 18 separate from control valve device 1.

It is well known that during charging, the auxiliary reservoir 3a is charged from brake pipe 6 via control valve device 1, and that the brake pipe and auxiliary reservoir effective across the service piston 10 is substantially equal. When a brake application is made, as by a reduction in the brake pipe pressure, the effect of the brake pipe pressure reduction is reflected by movement of the service piston 10 to its brake application position (shown), by the resultant preponderance of auxiliary reservoir pressure relative to the reduced brake pipe pressure. Accordingly, slide valve 13 is positioned by movement of the service piston such as to align passage 34 thereof with passage 35. Fluid delivery pressure communication is thus established between auxiliary reservoir 3a and brake cylinder device 5a via pipe 3, passage 12, the auxiliary reservoir pressure side of service piston 10, passage 34, passage 35, pipe 5, check valve 31 and choke 32. This delivery fluid pressure is also effective in chamber 22 of valve device 18 via branch passage 27 to reinforce the biasing effect of spring 21 in maintaining piston valve 20 engaged with seat 19.

If the brake application, above described, results from a service reduction of brake pipe pressure, as opposed to an emergency rate of brake pipe reduction, high pressure spool valve 14 will remain stabilized in the position shown, in which emergency reservoir fluid pressure is cut off from passage 26 by groove 17 in spool 14. Consequently, brake cylinder pressure will develop only until such time as the auxiliary reservoir pressure (equalizing with brake cylinder pressure) drops to the level of the reduced brake pipe pressure. When this occurs, service piston 10 assumes lap position in a conventional manner wherein no further supply or release of fluid pressure occurs.

In the event, however, that the brake application, above described, results from an emergency reduction of brake pipe pressure, brake pipe pressure will be completely vented by the action of the emergency piston (not shown) in a conventional manner. This action of the emergency piston further results in pilot pressure being connected to chamber 16 under spool valve 14, while concurrently the brake pipe pressure above spool valve 14 is vented. This causes spool valve 14 to be shifted to its upward-most position in which spool groove 17 establishes fluid pressure communication between passages 25 and 26. Fluid pressure is thus connected from emergency reservoir 4a to chamber 23 of poppet valve device 18 via pipe 4, passage 25, spool groove 17, passage 26 and pipe 26a. The effective area of the piston valve diaphragm 20 subject to the pressure in chamber 23 is selected such that piston valve 20 remains engaged with seat 19 until the auxiliary reservoir pressure is substantially equalized with the brake cylinder pressure.

By way of example, brake pipe pressure may be assumed during charging to reach a maximum level of 70 psi. with auxiliary reservoir 3a and emergency reservoir 4a being charged from brake pipe 6 to this same 70 psi. pressure level. Auxiliary reservoir 3a and brake cylinder 5a may also be assumed to have such combined volume as to establish 50 psi. therein when full equalization of the fluid pressure therein is permitted to take place.

Thus, when the effective pressure in chamber 22 is reduced to 50 psi. at the point of full equalization, the 70 psi. emergency reservoir pressure effective in chamber 23 will finally exert sufficient force on diaphragm piston valve 20 to disengage it from seat 19. Emergency reservoir pressure, heretofore isolated at cut-off valve device 18, is now conducted past valve seat 17 to chamber 24 and thence via branch pipe 28 to pipe 5 and brake cylinder device 5a to effect a further build-up of fluid pressure in brake cylinder device 5a above service brake pressure. Check valve 31 in pipe 5 prevents the emergency reservoir pressure from feeding back to the auxiliary reservoir, thereby preventing any equalization of the emergency reservoir pressure therewith. Accordingly, the higher brake cylinder pressure build-up during emergency is obtained by employing an emergency reservoir 4a whose volume may be considerably less than heretofore possible due to the reduced volume into which the emergency reservoir pressure equalizes, by reason of the auxiliary reservoir 3a being isolated therefrom.

Calculations have shown that the brake cylinder pressure during emergency can build up to 60 psi. consistent with conventional emergency brake pressures, but with an emergency reservoir 4a having only a 1200 cubic inch volume as compared to a standard 3600 cubic inch volume.

The brake cylinder pressure during service and emergency is effective in branch pipe 29 and passage 30 where it is blanked by the service slide valve 13. When it is desired to release the brakes, brake pipe pressure is increased, forcing service piston 10 to release position, in which passage 34 of slide valve 13 is shifted out of communication with delivery passage 35 and port 33 is communicated with passages 30, 35 and 36. Brake cylinder pressure effective in pipe 29 and also in pipe 5 upstream of check valve 31 is thus connected to atmosphere via respective passages 30 and 35, port 33 in the slide valve face, passage 36 and pipe 7.

Concurrent with movement of service piston 10 to release position, high pressure spool valve 14 is also forced, by the recharge of brake pipe pressure effective in chamber 15, to assume its release position (shown). Spool valve groove 17, in release position, disconnects passages 25 and 26 to isolate chamber 23 of cut-off valve device 18 from emergency reservoir 4a. Emergency reservoir pressure in passage 26, pipe 26a and chamber 23 is accordingly vented to atmosphere via chamber 24, branch passage 28 and pipe 5, which is vented via the service piston slide valve, as above explained. When this pressure under diaphragm piston valve 20 is exhausted sufficiently to allow spring 21 to reseat the diaphragm, the system will be reset preparatory to another brake application.

In thus providing a system permitting a reduction in the size of the emergency reservoir without a corresponding loss in emergency brake pressure, not only is a cost reduction and space savings realized, but a considerably shortened period is required to effect a brake release and recharge of the brake system throughout a train having cars equipped with a control valve device in accordance with the present invention.

Having now described the invention what I claim as new and desire to secure by Letters Patent, is:

1. A fluid pressure controlled railway vehicle brake apparatus comprising:
   (a) a brake pipe in which the variation of fluid pressure is effective to initiate brake application and release control of the brakes on said vehicle;
   (b) an auxiliary reservoir normally charged during brake release with fluid pressure at a value corresponding to the pressure carried in said brake pipe;
   (c) an emergency reservoir normally charged with fluid pressure corresponding to the pressure carried in said brake pipe;
   (d) fluid pressure operative brake means for effecting a brake application on said vehicle;
   (e) a fluid pressure operative brake control valve device comprising:
      (i) service brake control means for establishing fluid pressure communication between said auxiliary reservoir and said brake means in response to a reduction of fluid pressure in said brake pipe to provide a service brake application and for establishing fluid pressure communication between said brake means and atmosphere in response to an increase of fluid pressure in said brake pipe to provide said brake release; and
      (ii) emergency brake control means for establishing fluid pressure communication between said emergency reservoir and said brake means when said reduction of said brake pipe fluid pressure occurs at a predetermined rate to provide an emergency brake application;
   wherein the improvement comprises:
   (f) first and second conduits connected in parallel with said brake means via which said auxiliary reservoir fluid pressure and said emergency reservoir fluid pressure is conducted, respectively, in accordance with operation of said service and emergency brake control means;
   (g) cut-off valve means in said second conduit for interrupting fluid pressure communication between said emergency reservoir and said auxiliary reservoir during said emergency brake application until such time as said auxiliary reservoir fluid pressure is reduced to a predetermined value; and
   (h) a one-way check valve device in said first conduit preventing the flow of said emergency reservoir fluid pressure from said second conduit to said auxiliary reservoir via said first conduit.

2. Vehicle brake apparatus, as recited in claim 1, further comprising a third conduit connected between said service brake control means and said brake means in bypass of said one-way check valve device to permit a release of fluid pressure from said brake means in said release position of said service brake control means.

3. Vehicle brake apparatus, as recited in claim 2, wherein said cut-off valve means comprises:
   (a) a diaphragm piston valve;
   (b) an annular valve seat with which said piston valve is engageable;
   (c) first and second fluid pressure chambers formed on one side of said diaphragm piston valve, said chambers being separated by said valve seat, fluid pressure in said second conduit being communicated with said brake means via said first and second chambers except when said diaphragm piston valve is seated; and
   (d) a third fluid pressure chamber formed on the opposite side of said diaphragm piston and connected to said first conduit upstream of said one-way check valve device.

4. Vehicle brake apparatus, as recited in claim 3, further characterized in that the area of said diaphragm piston subject to auxiliary reservoir pressure in said third chamber exceeds the area of said diaphragm piston valve subject to said emergency reservoir fluid pressure in said second chamber by an amount sufficient to maintain said diaphragm piston valve engaged with said seat until such time as said auxiliary reservoir fluid pressure is reduced to said predetermined value.

5. Vehicle brake apparatus, as recited in claim 3, wherein said cut-off valve means further comprises a spring acting on said diaphragm piston valve in a direction to effect engagement thereof with said seat.

* * * * *